July 26, 1932.  O. J. KUHLKE  1,869,011
APPARATUS FOR THE MANUFACTURE OF LAMINATED RUBBER SHEETING
Filed Aug. 8, 1927   3 Sheets-Sheet 1

INVENTOR.
OTTO J. KUHLKE.
BY
Barrow
ATTORNEYS.

July 26, 1932.  O. J. KUHLKE  1,869,011
APPARATUS FOR THE MANUFACTURE OF LAMINATED RUBBER SHEETING
Filed Aug. 8, 1927   3 Sheets-Sheet 2

INVENTOR.
Otto J. Kuhlke
BY Ely & Barrow
ATTORNEYS.

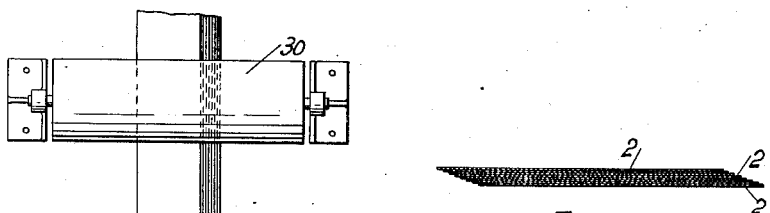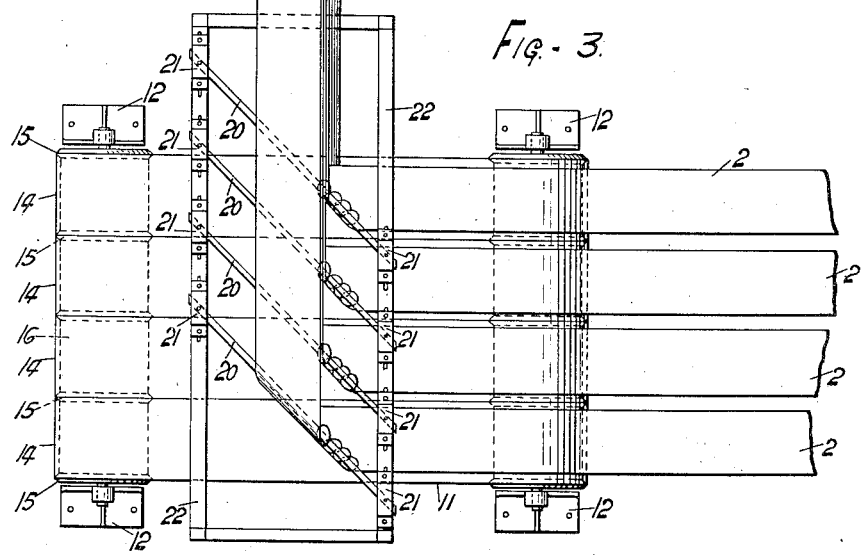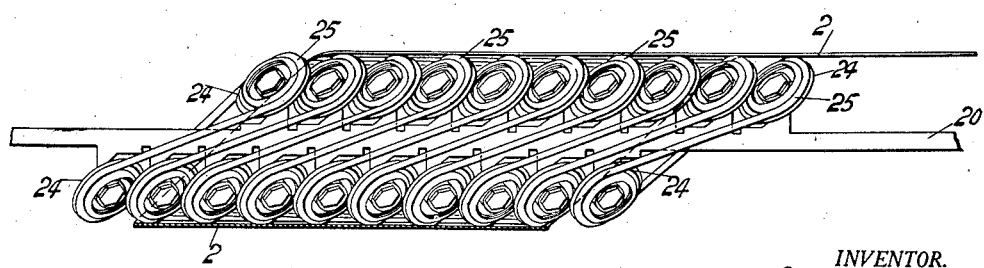

Patented July 26, 1932

1,869,011

UNITED STATES PATENT OFFICE

OTTO J. KUHLKE, OF AKRON, OHIO, ASSIGNOR, BY MESNE ASSIGNMENTS, TO NATIONAL RUBBER MACHINERY COMPANY, OF AKRON, OHIO, A CORPORATION OF OHIO

APPARATUS FOR THE MANUFACTURE OF LAMINATED RUBBER SHEETING

Application filed August 8, 1927. Serial No. 211,322.

This invention relates to the manufacture of laminated rubber sheets or stock which may have a variety of uses, but is particularly designed and intended for the manufacture of laminated rubber sheeting for use in the manufacture of inner tubes or similar articles of rubber.

In the manufacture of inner tubes for pneumatic automobile tires it is desirable to construct the tubes from laminated rubber sheeting, and particularly to manufacture such rubber sheeting directly from the stock as it is formed by the calender. The direct manufacture of the sheeting from the calender is desirable from the standpoint of economy and efficiency as the rubber sheeting is not handled during the manufacturing operation but is laid up as a part of the continuous manufacturing operation. It is therefore, not subject to the difficulties and expense of handling and manipulation before it is ready to be formed into a tube and vulcanized. While the method described is particularly adapted for the manufacture of tubes by the full-molded process, it may also be used in the manufacture by the pole process. Other fields of usefulness may be developed for the invention, and it is not necessarily limited to the manufacture of the tube stocks.

In the manufacture of tubes it is desirable that the various laminations be slightly offset from one another so as to secure stepped-off edges in the tube stock, which assists in the securing of a perfect joint where the edges of the sheet of rubber are abutted. The present invention provides for the formation of the stepped-off plies, the degree or extent of the step-off being adjustable in accordance with the particular demands or requirements.

An additional object of the invention is to provide apparatus which will laminate sheets of rubber of different color and composition.

A further object is to provide simple compact apparatus to superimpose rubber sheeting without attenuating the sheets.

It is also apparent that having explained the process and apparatus in detail, various changes or substitutions in particular form of the apparatus and details of the process may be made within the scope of the invention.

In the drawings:

Figure 3 is a plan view of the assembling unit;

Figure 4 is an enlarged detail of the turning device;

Figure 6 is an enlarged cross-section of a single sheet of stock manufactured in the apparatus.

Figure 1:
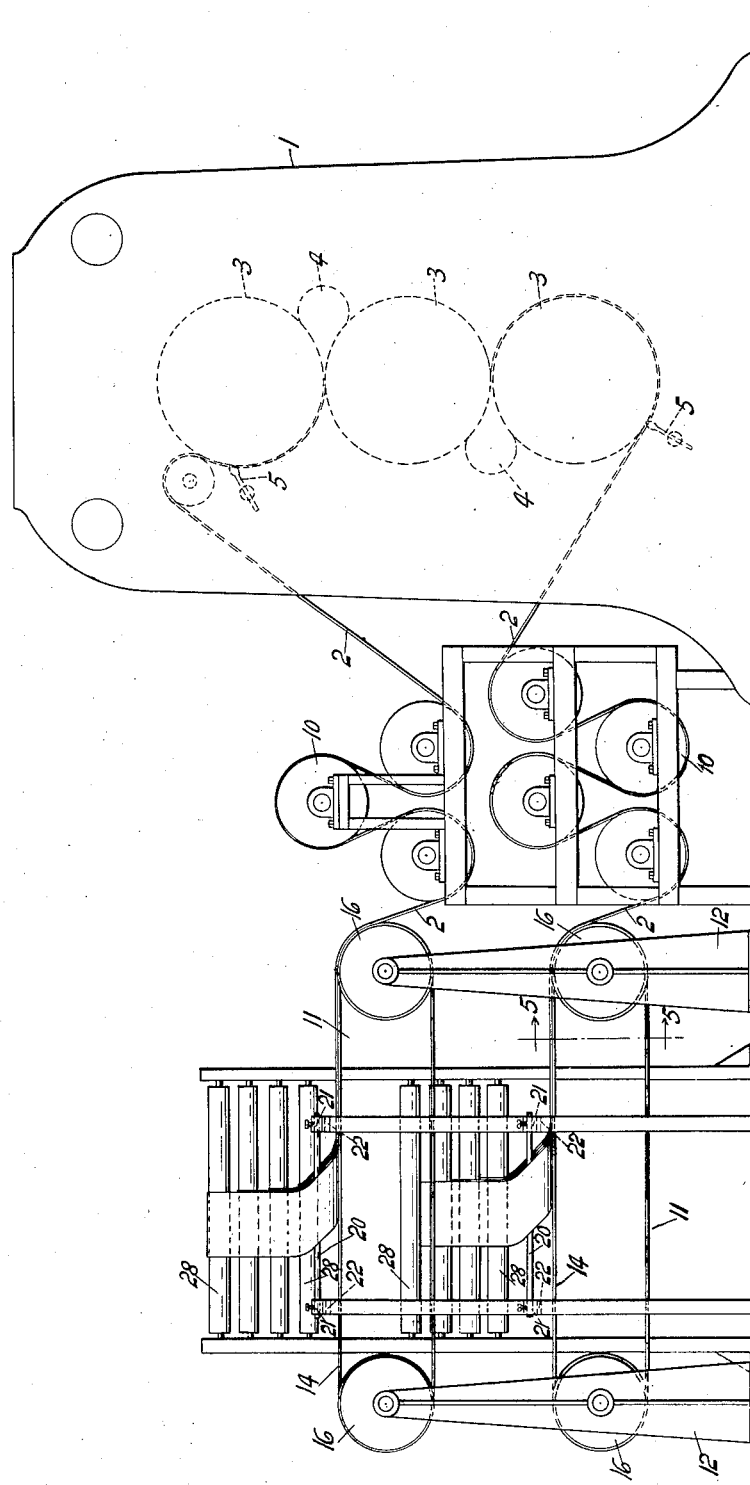
Figure 1 is a side view of a calender and assembling unit, the device being shown for the manufacture of an eight-ply stepped-off sheet of rubber.
Figure 2:
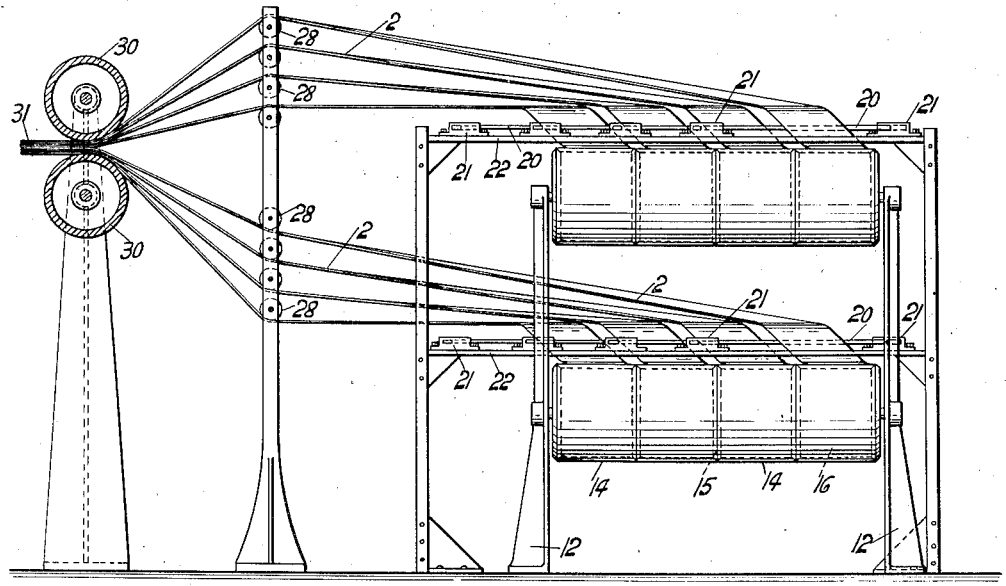
Figure 2 is an end view of the assembling unit.
Figure 5:
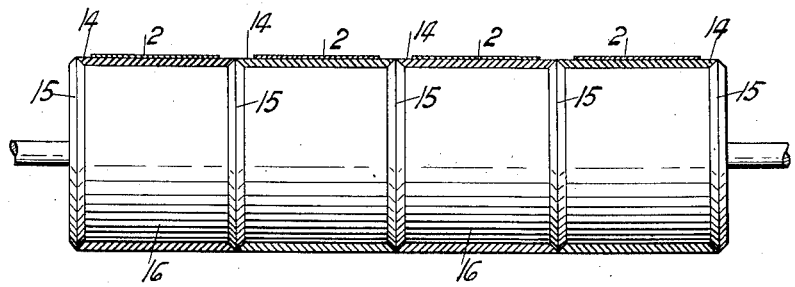
Figure 5 is a section on the line 5—5 of Figure 1.

In the drawings, 1 represents an ordinary 3-roll calender of standard construction upon which the several individual plies of rubber 2 are formed between heated rolls 3 and from two banks of rubber 4. These banks of rubber may obviously be of different color and composition, whereby the laminated sheet can be built up of the color and composition desired. The strips which constitute the several plies are cut by means of a plurality of knives 5 which bear against the calender rolls and cut the sheets of rubber into the plurality of strips which form the plies. As here shown, four strips are cut from each calender roll, the size and number of the strips being determined by the particular demands of each case. It is believed apparent that any number of rolls 3 and banks of rubber 4 can be employed to obtain desired results.

As the strips of rubber leave the calender, they are passed over a plurality of cooling rolls 10 and onto an endless conveyor 11 mounted in standards 12 of the assembly unit. In order to insure proper alignment of the rubber strips, the conveyor is preferably constituted of a plurality of belts 14 which are guided by ribs 15 in the belt pulleys 16, each of the belts may carry a single layer or strip of rubber, or if the strips are wider, they may overlap more than one belt.

In order to assemble the several strips to form the laminated stock, the several strips are turned at an angle to the line of their original travel so that instead of being in parallel relation they issue from the assembling unit in superimposed relation. In the broader aspects of the invention and the process to be covered herein, the strips may be turned from their parallel courses by any suitable means or in any suitable manner as long as the strips are not attenuated during the turning operation.

In order to obtain any degree of step-off, the expedient of turning the strips at different points is adopted. It will be evident that if all of the strips are turned at points which are in alignment across the strips, after the turning operation they will be superimposed with their edges in a vertical plane. If, however, the turning points are not in line, the edges of the strips will be correspondingly out of alignment. The invention is not necessarily limited to the stepped-off formation, as has been described.

After the several strips are turned in the manner described, they may be united into a laminated sheet by pressure rollers, or in any desired manner.

The specific means employed to obtain the turning of the strips or their deflection from parallelism to superimposed relation, consists of a plurality of bars or deflectors arranged across the line of parallel strips, one for each strip, and positioned at an angle of 45° to the line of travel of the several strips. The points of turning are adjusted to obtain the step-off feature by the longitudinal adjustment of the bars.

As the drawings illustrate two sets or groups of parallel strips, two sets of turning devices are to be employed. Each set comprises a number of diagonal bars 20, equal to the number of strips. The ends of each bar are carried in sleeves or bearings 21 slidably and adjustably mounted on parallel rails 22 across the assembly unit. By adjusting the position of the sleeves the points of turning may be adjusted as has been described.

Each bar is provided with upper and lower sets of rollers 24 which are mounted at angles of 45° to the horizontal and vertical planes, so that the rubber is given the complete 90° turn to direct it to a path at right angles to the line of its original travel. The rollers 24 are preferably mounted upon ball bearings, and to support the rubber sheet between the rollers belts 25 may be trained over the rollers above and below each bar.

The above construction of the turning means permits the strips to be bent into superimposed position without attenuation of any portion thereof, and also gives a compact unitary arrangement.

In order to keep all of the plies spaced apart until they reach the final assembly point, the several plies 2 are led over spaced guide rollers 28 from whence they converge to the final compressing point where they pass between pressure rollers 30 which form the final laminated sheet 31 from the several plies.

The apparatus and process have been briefly described, as the purpose of the present application is to cover the invention in its broadest aspects without reference to such specific details as may be varied in particular embodiments of the invention.

What is claimed is:

1. An apparatus for the manufacture of laminated rubber sheeting comprising a calender, means for cutting a plurality of parallel strips from the calender, a turning element disposed in the path of each of the strips and in contact therewith throughout the turning area adapted to turn such strips without attenuation from their parallel paths to paths overlying one another, said overlying strips being in a plane substantially parallel to the plane of their original path, and means for uniting the strips after they are superimposed.

2. An apparatus for the manufacture of laminated rubber sheeting comprising a calender, means for cutting a plurality of parallel strips from the calender, a single turning means disposed in the path of each of the strips and supporting the strips throughout the turning area arranged at an angle of 45° to the strips so that the latter are deflected without attenuation into overlying planes at right angles to their original line of travel, said overlying planes being substantially parallel to the plane of the path before turning, and means for uniting the strips after they are superimposed.

3. An apparatus for the manufacture of laminated rubber sheeting comprising a calender, means for cutting a plurality of parallel strips from the calender, a conveyor for carrying the parallel strips in a plane, a single turning means disposed in each of the paths of the several strips, all of said turning means being located above the conveyor and at different positions relative to the edges of the strips so that the turning points on the several strips are out of transverse alignment, the said means deflecting the strips without twisting from their parallel paths to paths lying in planes substantially parallel to the plane of the parallel paths, said paths overlying one another, and means for uniting the strips after they are superimposed.

4. An apparatus for manufacturing laminated rubber sheeting comprising a calender, means for cutting a plurality of parallel strips from the calender, a conveyor adapted to carry said parallel strips in a single plane, a plurality of turning means above said conveyor, each strip being carried over one of said turning means which supports the strip throughout the turning area and turns it without attenuation into a plane substantially parallel with the plane of the conveyor and into a path at right angles to the path of the conveyor, said turning means being so placed above the conveyor that the strips after turning are in superimposed position.

5. In apparatus for the manufacture of laminated rubber sheeting, the combination of a conveyor carrying a plurality of strips of calendered rubber in parallel relation in one plane, and a plurality of turning elements above the conveyor, said strips being bent over said turning elements which engage the strips throughout the turning area whereby the strips are placed in superimposed positions without attenuation.

6. In combination, in apparatus for making laminated rubber sheeting, a conveyor adapted to carry a plurality of calendered rubber strips in parallel relation in one plane, means for turning said strips into superimposed relation without attenuating one portion of any strip more than any other portion of the same strip, and pressure rollers to unite the strips after they are superimposed.

7. In combination, in apparatus for making laminated rubber sheeting, a conveyor adapted to carry a plurality of calendered rubber strips in parallel relation in one plane, means for turning said strips into superimposed relation without attenuating one portion of any strip more than any other portion of the same strip, said means comprising a turning element for each strip at 45° thereto, said element comprising a plurality of rollers mounted on a plurality of parallel offset axes, and pressure rollers to unite the strips after they are superimposed.

8. In combination, in apparatus for making laminated rubber sheeting, a conveyor adapted to carry a plurality of calendered rubber strips in parallel relation in one plane, means for turning said strips into superimposed relation without attenuating one portion of any strip more than any other portion of the same strip, said means comprising a turning element for each strip at 45° thereto, said element comprising two sets of parallelly mounted wheels and belts running between the aligned wheels of the two sets, and pressure rollers to unite the strips after they are superimposed.

9. In combination, in apparatus for making laminated rubber sheeting, a conveyor adapted to carry a plurality of calendered rubber strips in parallel relation in one plane, means for turning said strips into superimposed relation without attenuating one portion of any strip more than any other portion of the same strip, said superimposed strips after the single turning operation being in planes substantially parallel to the plane of the strips before turning.

10. In combination, in apparatus for laminating sheet rubber, a calender, means at a plurality of levels for forming strips of rubber in one plane in spaced side by side relation, a plurality of conveyors adapted to carry said spaced strips in superimposed parallel relation, and turning means above each conveyor engaging the strips throughout their turning region adapted to turn the spaced strips without attenuation out of the planes of the conveyors into superimposed relation with each other, the plurality of turning means cooperating so that the strips from the various conveyors are also superimposed.

11. In combination, in apparatus for laminating sheet rubber, a calender, means at a plurality of levels for forming strips of rubber in one plane in spaced side by side relation, a plurality of conveyors adapted to carry said spaced strips in superimposed parallel relation, and turning means above each conveyor engaging the strips throughout their turning region adapted to turn the spaced strips out of the planes of the conveyors into superimposed relation with each other without attenuating any portion of the strip, the planes of the superimposed strips being substantially parallel to the planes of the conveyors, the plurality of turning means cooperating so that the strips from the various conveyors are also superimposed, and means to unite all of said superimposed strips.

OTTO J. KUHLKE.